(12) United States Patent
Koryakin et al.

(10) Patent No.: US 8,171,255 B1
(45) Date of Patent: *May 1, 2012

(54) OPTIMIZATION OF PAGING CACHE PROTECTION IN VIRTUAL ENVIRONMENT

(75) Inventors: Alexey B. Koryakin, Moscow (RU); Alexander G. Tormasov, Moscow (RU); Nikolay N. Dobrovolskiy, Moscow (RU); Serguei M. Beloussov, Singapore (SG); Andrey A. Omelyanchuk, Moscow (RU)

(73) Assignee: Parallels IP Holdings GmbH (CH)

( * ) Notice: Subject to any disclaimer, the term of this patent is extended or adjusted under 35 U.S.C. 154(b) by 239 days.

This patent is subject to a terminal disclaimer.

(21) Appl. No.: 12/763,238

(22) Filed: Apr. 20, 2010

Related U.S. Application Data

(63) Continuation-in-part of application No. 12/559,556, filed on Sep. 15, 2009, now Pat. No. 7,856,542, which is a continuation of application No. 11/671,551, filed on Feb. 6, 2007, now Pat. No. 7,596,677.

(51) Int. Cl.
*G06F 12/00* (2006.01)
(52) U.S. Cl. ............... 711/207; 718/1; 711/E12.016; 711/E12.025
(58) Field of Classification Search .................. 711/206, 711/207, E12.016, E12.025; 718/1
See application file for complete search history.

(56) References Cited

U.S. PATENT DOCUMENTS

| | | | |
|---|---|---|---|
| 4,300,192 A | 11/1981 | Couleur et al. | |
| 5,764,999 A | 6/1998 | Wilcox et al. | |
| 6,785,886 B1 | 8/2004 | Lim et al. | |
| 7,277,998 B1* | 10/2007 | Agesen et al. | 711/163 |
| 7,596,677 B1* | 9/2009 | Koryakin et al. | 711/206 |
| 7,925,818 B1* | 4/2011 | Dobrovolskiy et al. | 711/6 |
| 2003/0126442 A1 | 7/2003 | Glew et al. | |
| 2006/0004944 A1 | 1/2006 | Vij et al. | |
| 2006/0026384 A1 | 2/2006 | Brandt et al. | |
| 2009/0055693 A1* | 2/2009 | Budko et al. | 714/57 |
| 2009/0300611 A1* | 12/2009 | Devine et al. | 718/1 |

* cited by examiner

*Primary Examiner* — Pierre-Michel Bataille
(74) *Attorney, Agent, or Firm* — Bardmesser Law Group

(57) ABSTRACT

A system, method and computer program product for virtualizing a processor include a virtualization system running on a computer system and controlling memory paging through hardware support for maintaining real paging structures. A Virtual Machine (VM) is running guest code and has at least one set of guest paging structures that correspond to guest physical pages in guest virtualized linear address space. At least some of the guest paging structures are mapped to the real paging structures. A cache of connection structures represents cached paths to the real paging structures. The mapped paging tables are protected using RW-bit. A paging cache is validated according to TLB resets. Non-active paging tree tables can be also protected at the time when they are activated. Tracking of access (A) bits and of dirty (D) bits is implemented along with synchronization of A and D bits in guest physical pages.

17 Claims, 11 Drawing Sheets

OPTIMIZATION OF PAGING CACHE PROTECTION IN VIRTUAL ENVIRONMENT

CROSS REFERENCE TO RELATED APPLICATIONS

This application is a continuation-in-part of U.S. patent application Ser. No. 12/559,556, Filed: Sep. 15, 2009, entitled PAGING CACHE OPTIMIZATION FOR VIRTUAL MACHINE (now U.S. Pat. No. 7,856,542), which is a continuation of U.S. patent application Ser. No. 11/671,551; Filed: Feb. 6, 2007, entitled PAGING CACHE OPTIMIZATION FOR VIRTUAL MACHINE (now U.S. Pat. No. 7,596,677), which are incorporated herein by reference.

BACKGROUND OF THE INVENTION

1. Field of the Invention

The present invention relates to virtualization technology, and, more particularly, to memory management for Virtual Machines.

2. Background Art

With Virtual Machine (VM) technology, a user can create and run multiple operating environments on a server at the same time. Each virtual environment, or Virtual Machine, requires its own operating system (OS) and can run applications independently. The VM software provides a layer between the computing, storage, and networking hardware and the software that runs on it.

Virtual Machine technology can lower information technology (IT) cost through increased efficiency, flexibility, and responsiveness. Each VM acts as a separate execution environment, which reduces risk and allows developers to quickly re-create different operating system (OS) configurations or compare versions of applications designed for different OS's. Additional uses for VMs include targeted production server consolidation, hosting of legacy applications (older versions), and computer or server backup.

Virtual Machine technology is therefore one technique for emulating or otherwise virtualizing the behavior of software and/or hardware. Generally, a Virtual Machine is an environment that is launched on a particular processor that is running a host operating system (HOS). Normally, the operating system installed on such a machine or processor has certain privileges that are not available to user applications. For example, many input/output commands may be privileged, and executable only in the operating system (or privileged) mode. Certain areas of memory, or certain addresses in memory, also may require operating system privilege to be accessed.

For each VM, a separate process is created, and the HOS is responsible for scheduling of both the VMs and other processes in the HOS. Examples of such hosted VMMs include VMware GSX Server, VMware Workstation, MS Virtual PC, MS Virtual Server and SVISTA 2004.

Throughout this discussion, it will also be assumed that the reader is generally familiar with the various addressing modes of the Intel™ processor architecture, as well as with virtualization techniques for the Intel™ family of processors. Generally, the Intel™ architecture has a number of relatively complex addressing schemes, all of which can be used by the processor at various times.

Furthermore, due to the need to support legacy software, over the years, the Intel™ architecture has grown increasingly complex, and therefore, increasingly difficult to virtualize. The practical consequence of this is that the performance of the virtualized operating system is frequently significantly slower than the performance of a non-virtualized code. One of the reasons for this involves the paging structures used by the operating system, and the need to virtualize them.

In the context of virtualization, the problem exists in having to efficiently map the paging structures of the guest operating system (GOS) to the paging structures of the Virtual Machine Monitor (VMM). As far as the GOS is concerned, this must be entirely transparent, however, the amount of physical memory that the GOS "really" has is usually much less than the amount of physical memory that the GOS "thinks" it has. This may be due to the fact that some of the memory is allocated to the VMM and to the host operating system.

It may be due to the fact that several Virtual Machines are running at the same time, and the physical memory therefore needs to be allocated between them by the host OS and/or VMM. The consequence of this is that very frequently, guest code running in a particular Virtual Machine will attempt to access a page in memory that the Virtual Machine thinks is mapped into linear space, however, in reality, that page is marked as "not present" and therefore absent in paging translation. This triggers a page fault, throwing control to the VMM, which needs to handle the page fault.

The problem of mapping between guest paging structures and VMM paging structures is something that has significant efficiency implications, because it is an overhead-intensive process. Thus, to improve the efficiency of the Virtual Machine, the number of page faults needs to be minimized and the amount of overhead associated with each page fault needs to be minimized as well. At the same time sufficient protection of paging tables needs to be provided.

Accordingly, there is a need in the art for an efficient mechanism for handling page faults and protecting paging tables in the context of virtualization technology.

BRIEF SUMMARY OF THE INVENTION

The present invention is directed to managing page faults and optimizing protection paging tables for a Virtual Machine that substantially obviates one or more of the problems and disadvantages of the related art.

In one aspect, there is provided a system, method and computer program product for virtualizing a processor include a virtualization system running on a computer system and controlling memory paging through hardware support for maintaining real paging structures. In another aspect, there is provided a method for optimization of paging tables' protection. A Virtual Machine (VM) is running a guest code and has at least one set of guest paging structures that correspond to guest physical pages in guest virtualized linear address space.

At least some of the guest paging structures are mapped to the real paging structures. For each guest physical page that is mapped to the real paging structures, paging means for handling a connection structure between the guest physical page and a real physical address of the guest physical page. A cache of connection structures represents cached paths to the real paging structures.

Each path is described by guest paging structure descriptors and by tie descriptors. Each path includes a plurality of nodes connected by the tie descriptors. Each guest paging structure descriptor is in a node of at least one path. Each guest paging structure either points to other guest paging structures or to guest physical pages. Each guest paging structure descriptor represents guest paging structure information for mapping guest physical pages to the real paging structures.

The VMM paging structures comprise a plurality of layers, each layer having at least one table with pointers to the next lower layer. Tie descriptors are associated with at least one of the layers, the tie descriptors (linking structures) including pointers to entries in the VMM paging structures corresponding to mapped guest paging structure entities, and back link information from the entries to the next-higher level structures.

In one embodiment, the layers include a zero layer with pages, a first layer with page tables, and a second layer with page directories. Depending on the addressing mode, there can also be, e.g., third layer with page directory pointer tables, and a fourth layer with PML4 tables. Each layer can have its own set of tie descriptors.

The VM can use one of standard, PAE and EM64T (or Long-Mode from AMD, or similar constructs in other processor architectures) addressing modes, and the VMM can use an addressing mode at least as high as the VM addressing mode. The tie descriptors can include pointers to other tie descriptors of the same layer, and/or pointers to paging elements of the next layer below, and/or pointers to paging elements of the layer above. A CR3 cache can also be used, such that entries in the cache are indices to the highest-level paging structure of the VMM.

According to another exemplary embodiment, the mapped paging tables (PDPT, PD and PT) are protected using RW-bit. A paging cache is validated according to TLB (Translation Lookaside Buffer) resets. Non-active paging tree tables can be also protected at the time when they are activated. The exemplary embodiment provides tracking of access (A) bits and of dirty (D) bits. It also provides for synchronization of A and D bits in guest physical pages.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
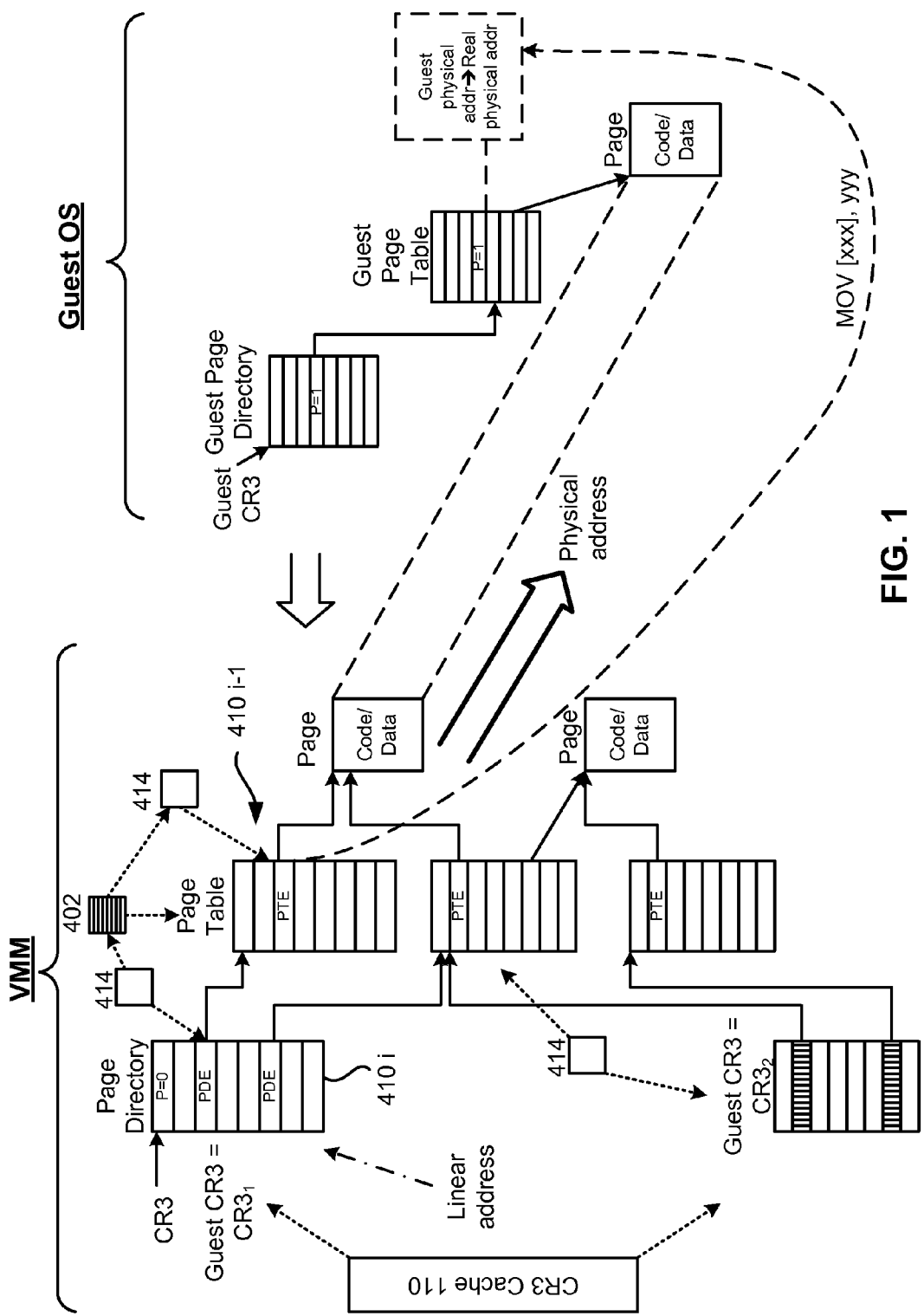
FIG. 1 illustrates the concept of mapping guest paging structures to VMM paging structures.

Reference will now be made in detail to the embodiments of the present invention, examples of which are illustrated in the accompanying drawings.

For purposes of the present discussion, it is assumed that the reader is familiar with Virtual Machines in general and virtualization of operating system and computer resources in particular. Examples of Virtual Machines are commercially available, for example, from Parallels Software International, Inc., the assignee of this application, from VMWare, Inc., and from Microsoft Corporation. This invention is applicable for any kind of virtual machines where a privilege level of virtualization system (Hypervisor, VMM, etc.) is present to maintain real paging structures, and there is guest linear address to guest physical address translation to execute instructions of the guest operating system.

In the Intel™ architecture, any memory access requires segment translation and future paging translation. To execute an instruction, the CPU uses code segment translation. To access data, CPU uses data segment translation. Any instruction utilizes at least one segment register to address the memory (code segment). For example, in the Intel™ processor, CS is the code segment register to execute instructions, SS is the stack segment register to storing data in the stack and DS, ES, FS, GS are segment registers for other data access.

For example, the processor checks the code segment register (CS) prior to execution of any code. Code (instructions) can be grouped by different code segments, and for each segment there is a corresponding value in the CS register (which defines the start (base) address of the segment, the privilege level, and the limit, or size, of the segment, such that the entire segment in memory is linear and is uninterrupted in terms of its addresses). Code/data offset is added to the segment base address, and this sum is the linear address.

Next, if paging translation is enabled, a linear address is translated to a physical address. The linear address is passed through paging structures to get the physical address. To start translation, there is a pointer register to the, topmost paging structure. In Intel™ architecture, the pointer is stored in a register called CR3.

Paging structures resemble a tree. The topmost layer is pointed to by CR3. The topmost layer paging structure consists of a pointer set to lower layer paging structures, and so on. To go through paging structures, a linear address is separated into several parts, usually by bit masks (e.g., see FIGS. 2B and 2C). Each bit sequence is responsible for a corresponding layer index to get a pointer to the lower layer. Usually the highest bits of linear address are responsible for topmost layer paging structure index, and lowest bits—for the offset on the physical page. Other processor families have similar schemes.

From one point of view, the virtualization system prefers not to emulate linear space access from the guest OS due to performance issues. Therefore, the virtualization system can map corresponding guest pages to paging structures where it executes guest OS code. In this case, the GOS will translate a guest linear address to a physical address by a real CPU. The exemplary embodiment, in one aspect, addresses how to cache such mapping.

From another point of view, the GOS places page mapping in their paging structures by using guest physical addresses. A guest physical address does not correspond to a real address, and usually the virtualization system has some sort of a guest to real physical address translation mechanism. Therefore, guest linear address translation can be real paging. This is another reason to have guest pages' mapping in alternative paging structures, different from the guest paging structures.

FIG. 1 illustrates, in schematic form, how paging structures are mapped from the guest OS to the VMM. In the discussion below, it will be assumed that the reader is generally familiar with the concepts of mapping. Although, the Intel™ architecture is used as an example, the invention is not limited to Intel™ architecture.

As shown in FIG. 1 on the right, the guest operating system maintains several structures for converting a linear address (in other words, the address specified in an instruction, such as instruction MOV [XXX], YYY, with XXX being the linear address), to a physical address that the processor actually uses to address a cell in memory. In order to convert the linear address to physical address, control-register CR3 points to a location in memory where the page directory is stored.

The page directory is a set of pointers, where each points to a particular page table. The entries in the page directory are called PDEs, or page directory entries, and the entries in the page table are called PTEs, or page table entries. The entry in the page table (PTE) then points to the particular page, which contains the code or data. Thus, the process of addressing a particular location in memory has four stages:

1) find the location of the page directory using CR3
2) find the appropriate page table using the PDE,
3) find the pointer (PTE) in the page table to the page containing the code/data, and
4) find the memory cell being addressed.

In a virtualized system that is running a GOS, pages that the guest operating system believes are in memory are not necessarily present in paging structures (i.e., in linear space), although this must be transparent to the GOS. Therefore, a relatively complex process needs to take place that maps the guest OS paging structures to the VMM paging structures.

As a practical matter, the VMM should map a page only if that page is actually being used by the guest operating system—those pages that are not used, or have not been used for some period of time, are usually swapped out of memory, to make room for other pages—this is particularly true of systems where one VMM is managing several Virtual Machines.

Thus, again with reference to FIG. 1, the guest CR3 points to the guest page directory, and the guest PDEs point to the guest PTEs, however, there is no guarantee that the pages to which the guest paging structures point are present in linear space—the VMM is responsible for making sure that an attempt by the guest OS to access a not-present page would trigger a page fault.

Upon the triggering of the page fault, a handler in the VMM makes sure that the appropriate page is loaded into memory, that the VMM's paging structures that reflect the physically present guest OS's pages are updated, and execution of the instruction that caused the page fault then resumes, now that the guest page is in present paging structures and can be addressed by the guest OS.

It should be noted that the real processor uses the "real" CR3, not the guest CR3, to address memory, and the real CR3 points to the VMM's page directory, not to the guest page directory. The VMM's paging structures reflect which pages are "actually" in memory, which ones are not, and various other associated information, that enables the VMM to handle page faults.

With further reference to FIG. 1, a virtualized system would normally include a Virtual Machine running a GOS, and a Virtual Machine Monitor (VMM) whose responsibility is to insure that the guest operating system's paging structures are properly virtualized. Consider the processing of an instruction MOV [XXX], YYY. This instruction copies the value YYY to the linear address XXX. The address XXX is not a real physical address, rather, it is a linear address that is derived by combining the value in one of the segment registers (by default, the data segment register, or DS) with the offset address XXX, to result in the linear address. Linear addresses provide a reference for the guest operating system to accesses memory.

However, linear addresses bear no relation to real physical addresses that the processor actually uses to manipulate data in real physical memory. To actually access the real physical memory cell that corresponds to the linear address DS.Base+XXX, the processor, in the standard addressing mode, utilizes the page directory/page table structures, discussed earlier. In the standard paging mode, the control register CR3 points to a location in memory where the page directory is stored. The page directory is a set of pointers, usually 1024 pointers that point to the location of a page table.

Thus, with the linear address converted to the physical address, through the sequence CR3-VMM page directory-VMM page table-physical page (which is 4 kilobytes in size), the instruction can now be executed.

One additional complication of modern operating systems is that, typically, a number of processes are being simultaneously managed by the operating system. Each such process typically has its own address space, and each such process usually has its own page directory, its own set of page tables, and possibly its own area of physical memory (in other words, its own set of physical pages).

The operating system switches between the processes by changing the value of the control register CR3—by having the control register CR3 point to a different page directory (with its different set of page tables and therefore different pages), the operating system can switch the context between the various processes.

Page faults are a very common occurrence in Virtual Machine technology, and are highly overhead-intensive. Therefore, the question of how to handle page faults efficiently, minimizing the overhead associated with each page fault and minimizing the number of such page faults, directly impacts the performance of the Virtual Machine. Again with reference to FIG. 1, the guest operating system on the right half of the figure has a page directory, referred to as a "guest page directory," to which the guest control register CR3 points. In the guest page directories, for those pages that the guest operating system thinks are present in the linear space, there is a corresponding entry in the guest page table, which points to the page. This structure needs to be mapped to the VMM paging, which represents correct mapping to guest pages for the guest operating system.

As shown on the left half of FIG. 1, the Virtual Machine Monitor has paging structures, to which the guest paging structures are mapped. However, simply copying the paging structures and working with them directly would be extremely inefficient. In fact, as may be seen in FIG. 1, there are a number of paging structures.

Also, two additional structures are shown in FIG. 1—a CR3 cache 110, and linking structures 414, also discussed with reference to FIG. 4, referred to as "tie descriptors." The CR3 cache 110 is essentially a small database of cached paging translations for various values of the control register CR3, such that each value points to a different page directory of the VMM. When the guest operating system switches context between two processes by loading a different value into the control register CR3, the VMM can do the same, such that the "real" CR3, instead of pointing to the top page director ($CR3_1$), can point to the page directory on the bottom of FIG. 1 ($CR3_2$).

In essence, the switching of the context within the guest operating system can be mirrored by the switching of the context within the VMM. The CR3 cache 110 is used for storing sub-caches for different values of CR3. When guest OS switches to another CR3 value, the VMM switches to an additional higher layer for caching multiple sets of paging caches and corresponding real paging structure set instead of whole paging cache reset.

More complex criteria (or conditions) for choosing a sub-cache branch for current guest OS working mode can be used in the cache 110, rather than simple value of control register. For example, complex criteria can be used within guest OS paging schemes, where new guest paging structures are copied from another set.

Also, it is worth noting that when a page fault occurs, the address that caused the page fault is loaded into the control register CR2, which allows using the control register CR2 as an index into the CR3 cache 110. Also of note is that PDEs from different page directories can point to the same page table, as illustrated in FIG. 1. Furthermore, it should be remembered that the VMM operates on the same rules as the guest operating system, as far as the addressing scheme is concerned.

In other words, the PDEs and the PTEs in the VMM's page directories and page tables represent real physical addresses, however, there are no instructions in the Intel™ instruction set that utilize real physical addresses—therefore, the VMM needs to use linear (and offset) addresses when manipulating its page directories and its page tables. In order to enable this process to occur efficiently, linking structures, such as tie descriptors 414 need to be utilized, as discussed further below.

When an instruction in the Virtual Machine attempts to access a page whose present bit is set to 0 (i.e., the page is not present in linear space), a page fault is triggered, and a VMM page fault handler is invoked. The page fault handler's job is therefore to load the page into physical memory, to map the page into the VMM's paging structures, and then restart the execution of the instruction that caused the page fault, such that the guest OS would not realize that a page fault had occurred.

Part of the VMM page fault handler's job is to map the PDE and the PTE properly, in other words, load the proper PDE value into the appropriate page directory, and load the proper PTE value into the appropriate page table. In one possible embodiment, the VMM creates alternative page directories and page tables for real mapping. Furthermore, the linking structures 414 need to be updated, to ensure that the page fault handler does its job efficiently, as will also be discussed below. Also, the paging cache 110 needs to be updated, and the CR3 register needs to be loaded with an address that points to the appropriate page directory.

A mirror process needs to take place when a page that is currently in linear space needs to be swapped out for a different page. In that case, the page's present bit needs to be set to zero and all the pointers in the paging structure that point to that page need to be reset. Since the guest OS is unaware that a page that it believes is in linear mapping has been swapped out, it is the paging structures in the VMM (not in the guest OS) that need to be synchronized with that event. The appropriate page table entries need to be set to zero, the appropriate page directory entries needs to be set to zero, if necessary, etc.

As noted earlier, the same page can be pointed to by different page tables, similar to the same page table being pointed to by different page directories. All of these need to be updated to reflect the fact that the "real" page is no longer in linear mapping. In the absence of some optimization, this would be a relatively time consuming process—e.g., all the entries in the appropriate page table would need to be searched, to see if it points to the swapped-out page—in the case of a page table with 1024 entries, this would require checking 1024 entries.

Similarly, when updating the page directory, every PDE in the page directory needs to be checked, for a total of 1024 PDEs. As it is clear from this example, this is a time consuming process, which, when repeated thousands or hundreds of thousands of times per second, as is the case with Intel™ processors and Virtual Machine technology in 2006, has a severe impact on the performance of the Virtual Machine. Accordingly, the linking structures 414 are also used to quickly identify which PTEs and PDEs relate to the swapped out page, zeroing them out quickly and efficiently. This will be discussed further below with reference to FIG. 4.

At this point it is worthwhile to address the circumstances when a page is swapped in and out of physical memory by the VMM. As noted earlier, the amount of physical memory allocated to each Virtual Machine (and its corresponding guest OS) is usually a fraction of the physical memory that is available on the physical computer, and is typically less than the Virtual Machine "thinks" it has allocated to it by the hardware.

Therefore, the situation of having to swap a page in and out of memory is a frequent occurrence. Any number of algorithms can be used to determine which page (of the pages that are physically currently in memory) should be as swapped out, to be replaced by the page whose attempted access triggered the page fault. One such algorithm is last-used-first-out. Here, the page that has not been accessed in the longest amount of time becomes the most likely candidate for being "tossed out."

Other, more sophisticated algorithms can be used, however, empirical experience (or, at least, the experience of the inventors) shows that the predictive abilities of most such algorithms are fairly limited, and might not show any visible and/or significant improvement over the last-used-first-out approach. In theory, a good predictive algorithm might obviate the need for optimization of the handling of page faults, in practice, however, this problem has thus far defied a predictive solution.

Figure 2A:
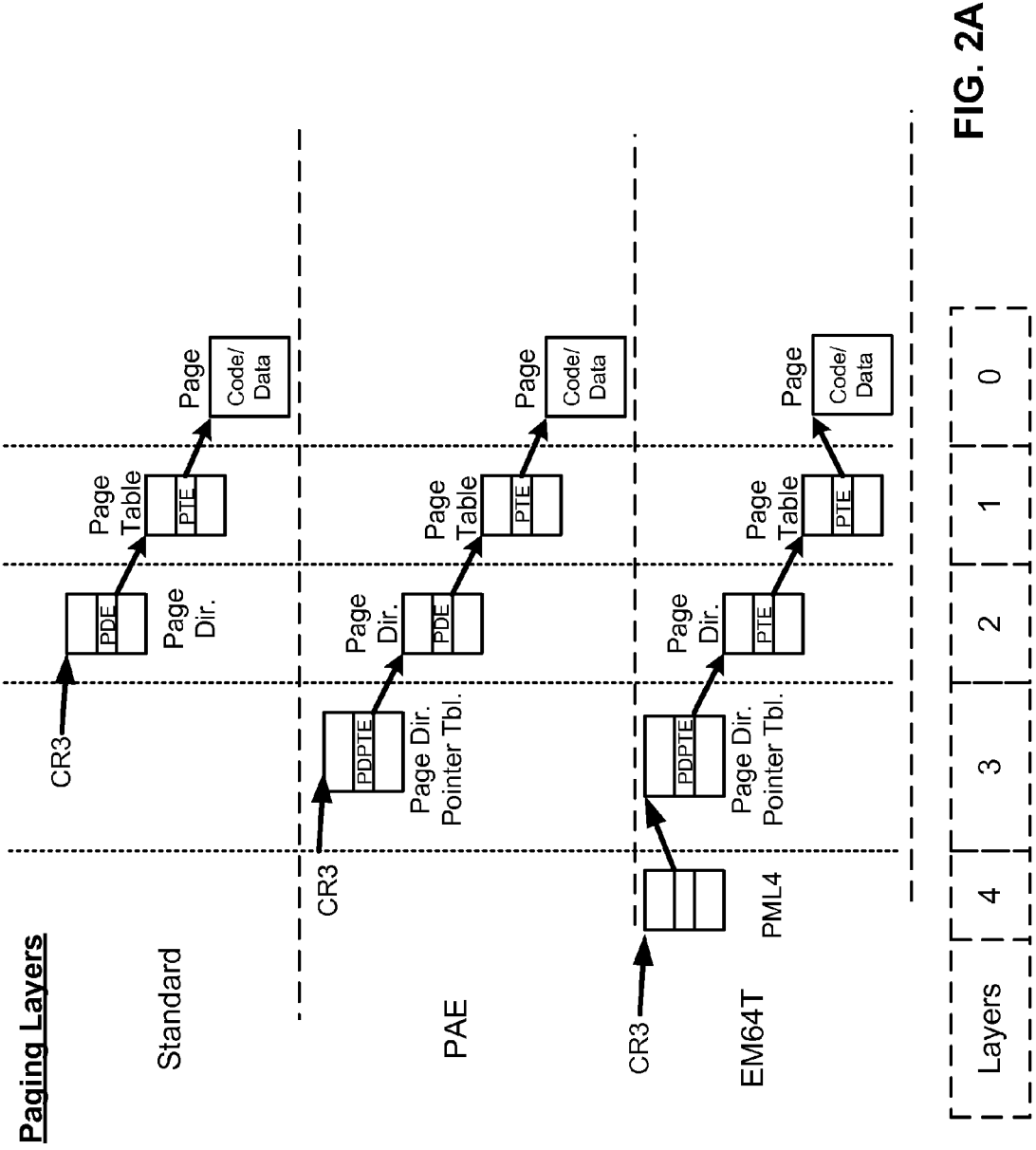
FIGS. 2A, 2B, 2C illustrate the various addressing modes of the Intel™ architecture, as they pertain to one embodiment of the invention.

FIG. 2A illustrates the concept of layers as it relates to the Intel™ architecture and the present invention. As shown in FIG. 2A, the simplest mode of addressing, in the Intel™ architecture, is referred to as the "standard" mode, and uses 32 bit addresses. In this case, the 32 bit linear address is converted to a 32 bit physical address using the values in one of the segment registers (code segments CS, data segment DS, etc.) and the 32 bit offset.

Figure 2B:
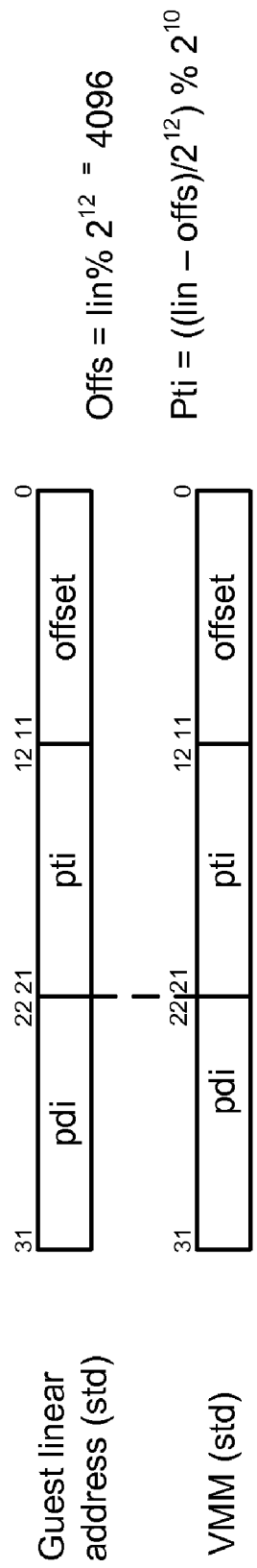

The 32 bit linear address that is thus formed is then translated into a physical address by the processor using a page directory and a page table, which are both in physical memory. With reference to FIG. 2B, the 32 bit address of the standard mode can be viewed as having a 12 bit offset within a page, a 10 bit index into the page table (called "pti", or page table index), and a 10 bit index into the page directory (called pdi, or page directory index). This is the linear address that is converted to the physical address.

Figure 2C:
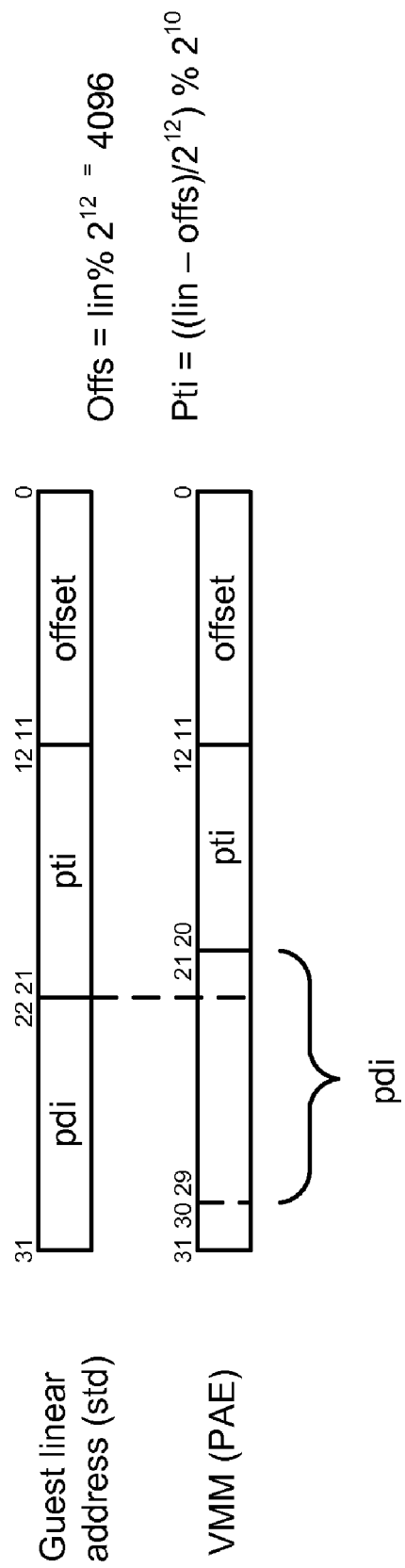

In the physical address extension (PAE) addressing mode, see FIG. 2C the address can be 36 bits. To store wide physical addresses in paging structures, their entries have to be wider than 32 bits. In this case Intel™ make them 64 bit. Therefore, any paging structure in PAE mode has 512 entries (not 1024, as in standard one). Linear address width remains the same and is equal to 32 bits, but the address structure shown in the top half of FIG. 2C is changed to structure shown in the bottom of FIG. 2C using masking.

Also, an additional structure, called page directory pointer table, or PDPT, was added and is used, essentially in the same manner as in a standard addressing scheme (but as an additional "layer"). The PDPT layer, in the context of the present discussion, is referred to as layer 3. FIG. 2C shows how linear address masks in guest standard paging mode are mapped to the VMM's PAE mode linear address masks.

The EM64T addressing mode uses 48 bit linear addresses, and uses an additional structure, called PML4, which functions analogously to the lower layer structures—with the CR3 pointing to the PML4, an entry in the PML4 table pointing to the PDPT, etc.

As the reader will appreciate, the addressing scheme of the Intel™ architecture has consequences for how the VMM can function. If the guest OS is a 32 bit operating system (in other words, that uses only standard addressing scheme), then the VMM can also remain in the standard addressing mode. However, the VMM can also use the PAE mode, or the EM64T mode. If the guest OS uses a PAE addressing mode, then the VMM must use either PAE mode, or the EM64T mode. If the guest OS uses EM64T addressing mode, then the VMM must use EM64T as well. In sum, the addressing mode of the VMM should be "no lower" than the addressing mode of the guest OS.

Figure 3:
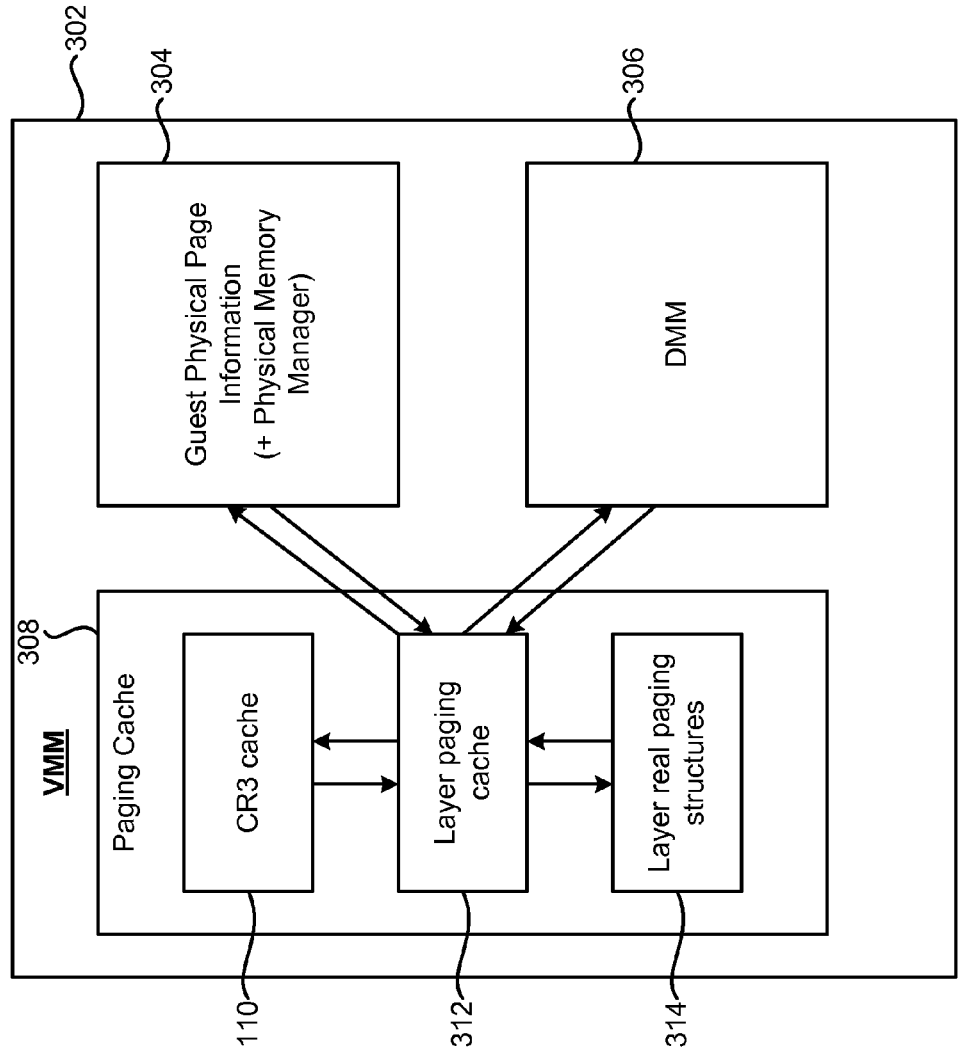
FIG. 3 illustrates a high-level relationship between the paging cache of the VMM and other VMM subsystems.

With the above discussion of FIG. 1 and the associated processes of swapping pages in and out of memory (and corresponding updating of the paging structures) in mind, FIG. 3 illustrates an overall high-level architecture of the paging cache approach described herein. As shown in FIG. 3, the VMM 302 has a number of elements that are relevant to the present discussion (as will be understood by one of ordinary skill in the art, the VMM can have a number of other elements and subsystems, and the complexity of some Virtual Machines can rival the complexity of an operating system—however, those aspects are generally outside the scope of the present discussion).

As shown in FIG. 3, the paging cache 308 of the VMM 302 includes at least three elements—the CR3 cache 110, the layer paging cache 312, and the layer real paging structures 314. The CR3 cache 110, as discussed earlier, is a structure that keeps track of the guest CR3 used by the various guest operating systems, and the various corresponding processes within those guest operating systems.

The entries in the CR3 cache 110, each of which corresponds to a (usually) distinct guest CR3, point to the particular VMM page directory associated with that guest process. The change of the context by the guest operating system, which involves changing the CR3 in the guest operating system to point to a different guest page directory, triggers an associated change of the "real" CR3 in the VMM, such that the CR3 of the VMM will point to a different paging structure (page directory and page table), thereby effecting a context switch, before the execution of the guest code resumes.

The paging cache 308 also includes the layer paging cache 312. Each layer in the paging structure has its own associated tables and linking structures, which generally work in a similar manner from layer to layer. For example, in the standard addressing mode, there are three layers—the pages themselves (zero layer), the page tables (layer 1), and the page directories (layer 2).

Other addressing modes, such as PAE (physical address extension), which allows handling a much larger physical address space, using 36 bit addresses, or the EM64T mode, which operates with 56 bit addresses, have layer three (page directory page table, or PDPT, in the case of PAE), and layer four in the case of EM64T, which uses PML4 tables. The paging cache 112 includes the connecting elements (tie descriptors) 414, lists of mapped elements (in other words, those elements in the next layer that are present in the cache), and back links to the "layer above," as will be discussed further with reference to FIG. 4.

The real paging structures 314 of each layer include real tables and entries that fully describe mapping of corresponding layer. For example, if both the guest OS and the VMM work in the same paging mode (see FIG. 4), paging structures differ and linear address mask to determine entries indexes in paging structures (see FIG. 2B) are the same. In this case, to map a guest page table into VMM paging, the VMM represents it by corresponding single page tables (one-to-one relationship).

As another example, if the guest OS works in a standard paging mode, the VMM is in PAE mode (see FIG. 5), the format of paging structures differs: the guest page table has 1024 4-byte-long entries, the VMM page table has 512 8-byte-long entries. Linear address masks to determine entries in paging structures also differ (see FIG. 2C). In this case, to map a guest page table into VMM paging, the VMM represents each guest page table as two real page tables. Therefore, two PDEs from the VMM's page directories point to these two real page tables. Guest page directory is mapped by one real page directory, one page table and four page directories.

FIG. 3 shows one possible subsystem hierarchy involved in paging cache maintenance. It includes two auxiliary subsystems: guest physical memory information tracker with Physical Memory Manager 304 and DMM 306.

Various structures in mechanisms used for physical memory management are discussed in co-pending application Ser. No. 11/558,498; Filed: Nov. 10, 2006, entitled EXPANSION OF VIRTUALIZED PHYSICAL MEMORY OF VIRTUAL MACHINE, which is incorporated by reference in its entirety. In essence, element 304 is responsible for translation guest physical addresses to real addresses and for maintaining virtualization of guest physical memory.

Also, shown in FIG. 3 is the dynamic memory manager 306, which is the sub-system that is responsible for centralizing allocating and de-allocating memory buffers and pages in the VMM for different subsystems included in the paging cache. The sub-systems of 314 is where the real CR3 (i.e., the CR3 of the VMM) points to during guest code execution, to virtualize guest linear space. Sub-systems of 314 are responsible for maintaining real paging structures to form correct paging model for execution guest code.

The layer paging cache 312 is, in essence, a representation of which guest OS pages are mapped, which pages are not mapped, and associated structures for optimizing search and synchronization between the mapped paths, the not-mapped paths, and for general tracking of mapped pages.

Figure 4:
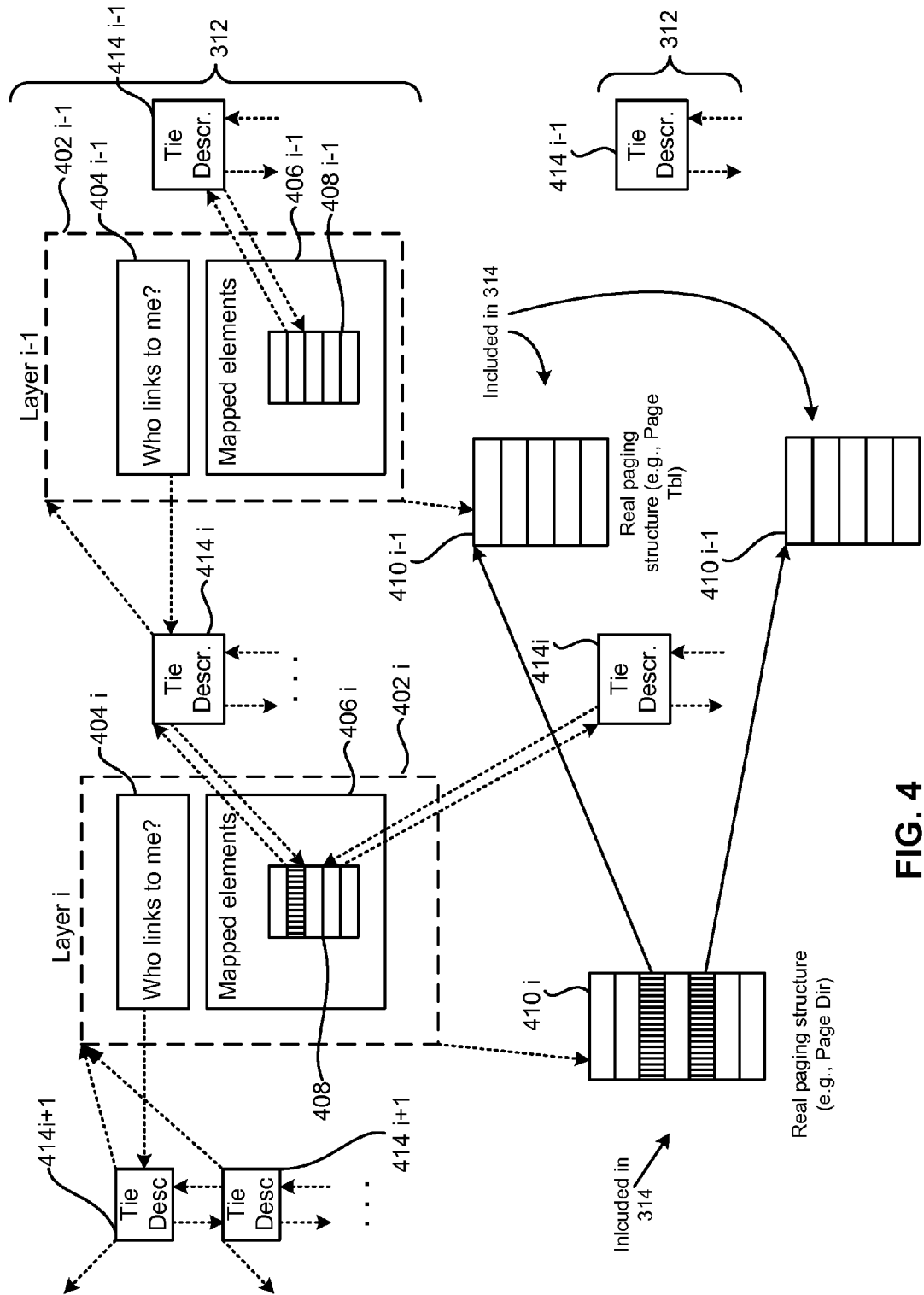
FIG. 4 illustrates the caching of paging structures when the VMM paging mode is the same as the guest paging mode, for the standard paging addressing mode of the Intel™ architecture.

FIG. 4 illustrates in more detail the relationship between the various elements of the layer paging cache 312 and the real paging structures 314. Starting with the real paging structures 314, in the case of layers 1 and 2, where in FIG. 4 "i" refers to layer 2, which contains the page directories, and "i-1" refers to layer 1, which contains the page tables, the figure shows a real paging structure 410$i$, which in this case is a page directory that contains real physical addresses pointing to page tables (in this case, two page tables are shown, labeled 410$i$-1). The elements 410$i$-1 also contains real physical addresses, in this case, real physical addresses of real pages in real physical memory. In other words, with the VMM's CR3 pointing to 410$i$, a linear address can be translated by the processor into a physical address, in order to access a cell in memory.

Further with reference to FIG. 4, the use of the tie descriptors 414 is illustrated. As noted earlier, the code of the VMM has to use the same addressing scheme as any other code—there are no instructions that use physical addresses, only linear addresses. Thus, linking structures (tie descriptors) 414 are used to keep track of which pages have been mapped, and which ones have not.

Specifically, considering the tie descriptors 414$i$, the tie descriptor has a pointer to the structure 406$i$, which contains a list of all the mapped elements of this layer (see 408). Note that of all the possible entries in, for example, the page directory, only a small fraction of the 1024 possible entries might actually be mapped—in many practical cases, this number could be as few as one or two, or a few dozen—illustrating the inefficiency of a brute force approach to checking the page directory directly for which pages and page tables have been mapped, and which ones have not.

The mapped elements 408 contain pointers to those entries in the page directory that represent mapped pages—thus, the number of the mapped elements 408 equals the numbers of entries in a page directory that corresponds to the page tables that are actually used. Element 404$i$ represent a back link to tie descriptors on the next layer "above." Also note that the tie descriptor 414 has links to and from at least one other tie descriptor on the same level (assuming, of course, there is at least one other one).

Thus, when an element on the next lower layer is removed (for example, a page is swapped out or a page table is no longer used), by referring to the tie descriptor 414$i$ (through the "who links to me?") element 404$i$-1, it is easy to identify only those elements on this layer that refer to the swapped out element. For example, if two different page directory entries (PDEs) from two different page directories point to the same page table, using the tie descriptors 414$i$, they can be quickly identified and zeroed out.

Figure 5:
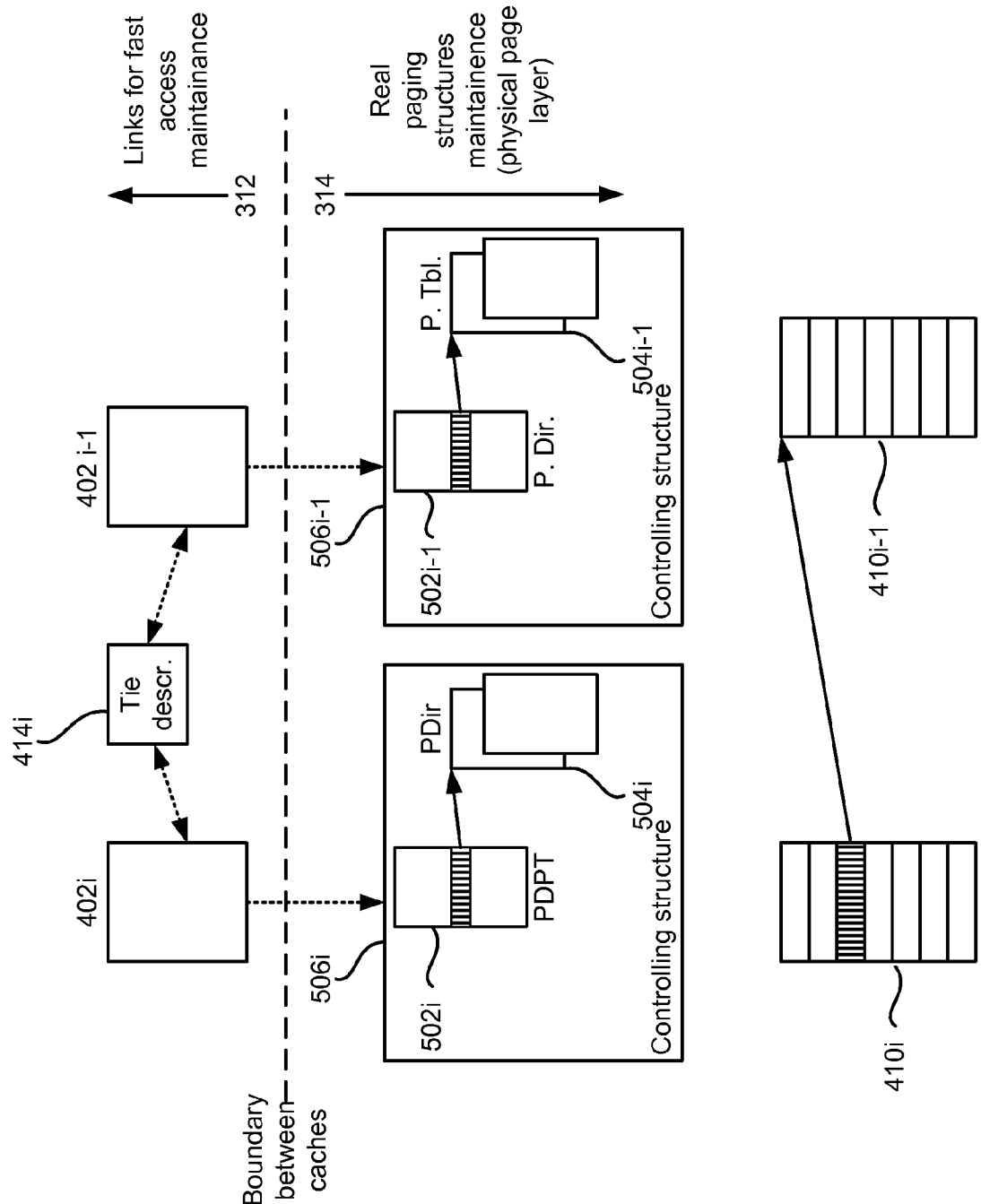
FIG. 5 illustrates the caching of paging structures when VMM paging mode differs from the guest paging mode, for the PAE/EM64T paging addressing mode of the Intel™ architecture in the VMM and standard paging mode in the guest OS.

VMM can use another paging model to virtualize guest OS which uses another model. For example, FIG. 2C shows that guest OS works in a standard paging model. The VMM works in the PAE mode. FIG. 5 shows how the VMM organizes paging cache in this case. Linear addresses masks here are also different due to the fact that the format of the paging structures is different.

In this case, the number of paging structure entries is differed: there are 1024 entries in standard mode and 512 entries in PAE mode. To translate one kind of paging to another one, the VMM needs to organize paging structures in the proper manner. To do this, the VMM organizes paging cache in terms of guest OS paging model. In other words, the nodes of paging cache are descriptors of guest OS paging structures and real paging structures 410 (represented by elements illustrated on 506) are linked to guest paging structure descriptor 402.

As another example, if the guest OS works in the standard paging mode, the VMM is in PAE mode (see FIG. 5), the format of paging structures differs: guest page table has 1024 4-byte-long entries, and the VMM page table has 512 8-byte-long entries. Linear address masks to determine entries indexes in paging structures also differ (see FIG. 2C).

In this case, to map the guest page table into VMM paging, the VMM represents each guest page table as two real page tables. Therefore, two PDEs from the VMM page directories point to these two real page tables. The guest page directory is mapped by using one real page directory page table and four page directories.

Figure 6:
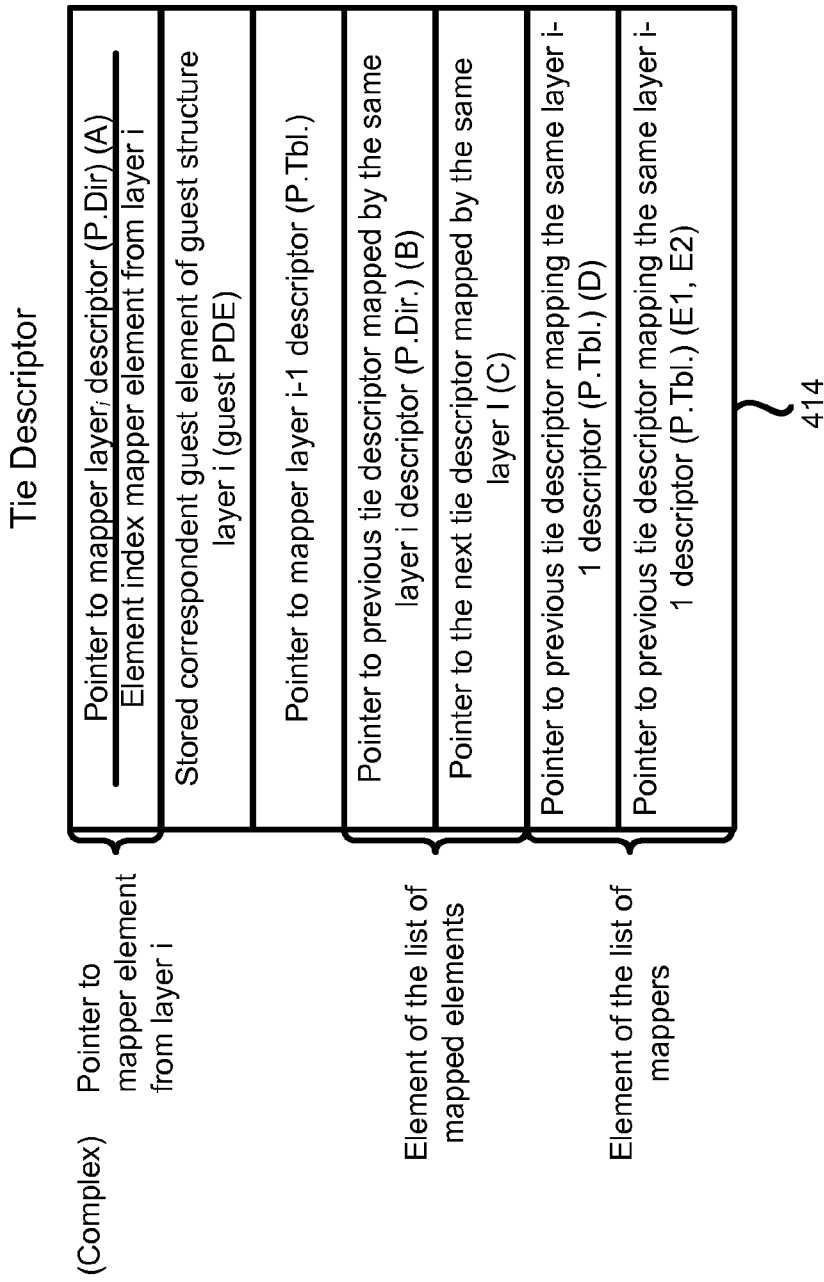
FIG. 6 illustrates one implementation of a tie descriptor.
Figure 7:
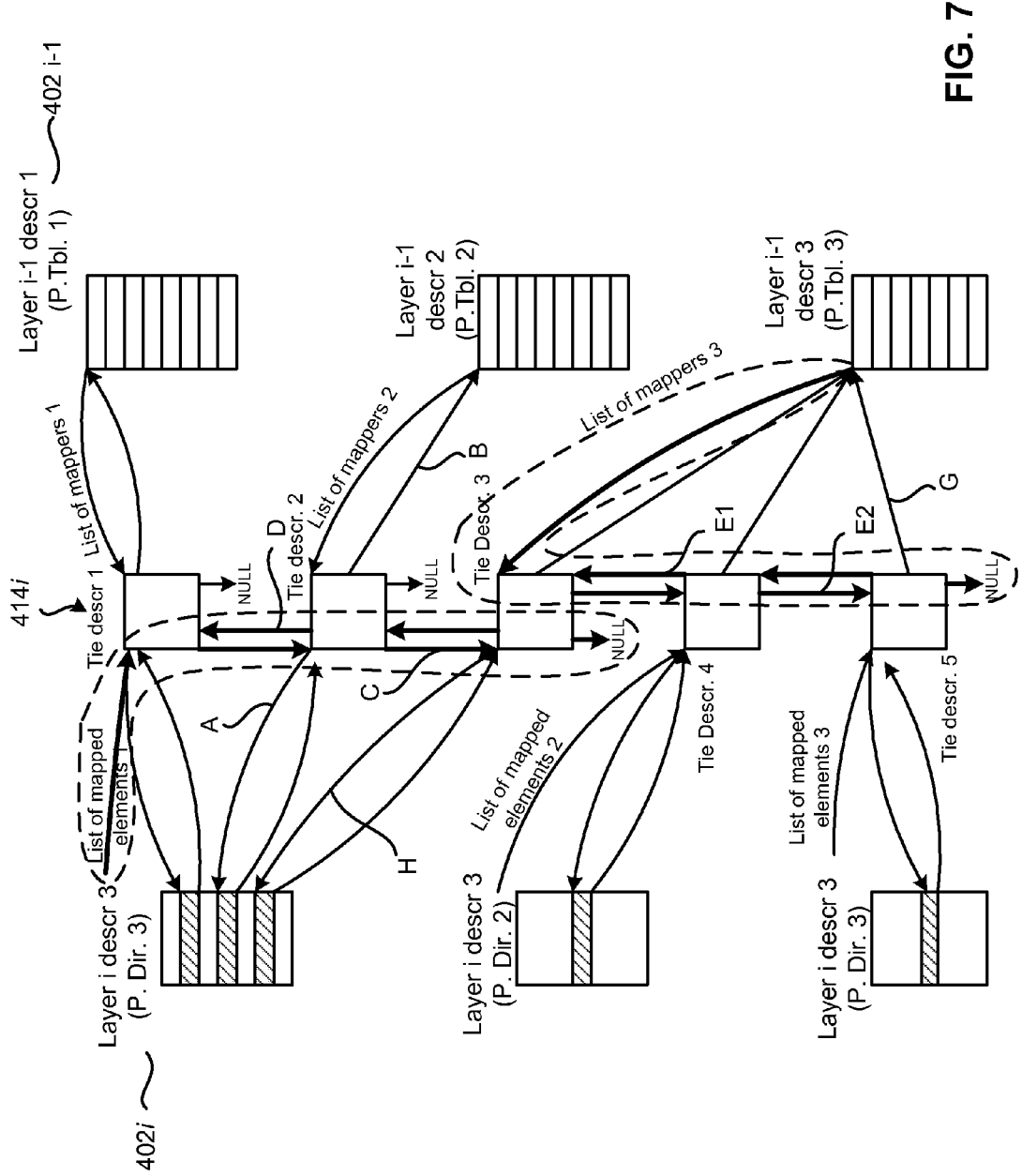
FIG. 7 illustrates additional detail of how tie descriptors are used.

FIGS. 6 and 7 illustrate in additional detail how the tie descriptors 414 work. FIG. 6 illustrates the fields that a typical tie descriptor 414 can have, and FIG. 7 illustrates how these fields correspond to pointers to the various elements of the structure described earlier. As shown in FIGS. 6 and 7, the first field is a pointer to a mapper layer i descriptor (in this case, to the page directory). For tie descriptor 2, this pointer is designated by A in FIG. 7.

The next field is the element index of the mapper element from layer i (in other words, the number of the entry in the page directory, see the hatched element in the structure 408 in FIG. 4, and the arrow G in FIG. 7). The next field is the stored corresponding guest element of the guest structure of the layer i (in other words, of the guest PDE). This contains information about the guest PDE, such as permissions, privilege levels, etc., (essentially, as an optional performance optimization to avoid excessive accessing of the guest paging structures in the guest memory) which the VMM can access without having to go into the guest code pages themselves.

The next field is a pointer to the mapper layer i descriptor (to the page table, see H on FIG. 7). The next field is a pointer to the previous tie descriptor that is not in the same layer i descriptor, in other words, analogous to the guest code pointer from the page directory to the page table. In this case, with tie descriptor 2, this corresponds to the arrow B in FIG. 7.

The next field is a pointer to the next tie descriptor (tie descriptor 3) that is mapped in the same layer, in other words, in this case, this corresponds to the arrow labeled C that points to tie descriptor 3. The next field is a pointer to the previous tie descriptor that maps the same layer i-1 descriptor (in other words, mapped the same page table). This corresponds to the arrow labeled D in the FIG. 7.

The next field is a pointer to the next tie descriptor (tie descriptor 1) that maps the same layer i-1 descriptor. In this case, using the examples of tie descriptors 3, 4 and 5, this corresponds to the arrows labeled E1 and E2. These can be used more efficiently to delete paging structure, such as page directories and page tables, for example, to free up space explicitly or because at some point at time a particular structure becomes empty.

Note that if the same guest physical page performs two (or more) roles in guest paging translation (e.g., it acts as page directory and page table in the same time), then the VMM creates separate paging structure descriptors in the cache to represent valid mapping paths going through these structures.

One of the aspects that the VMM designer needs to decide on is which addressing mode the VMM itself would use. One option, if the guest OS is 32 bit OS, standard mode can be used for the VMM as well. If some of the guest OS's are 32 bit OS's, and others use PAE or EM64T addressing modes, then one option possibility is to use separate VMMs for the different addressing modes, with one VMM supervising the standard addressing mode OS, the other VMM supervising the PAE addressing mode OS, etc. Another option is to use a "universal" VMM, which uses the highest addressing mode, such as EM64T. This has significance for how the tie descriptors are structured, and the size of the tie descriptors.

In the 32 bit OS case, if the VMM is also 32 bits, the tie descriptors who would be 32 bits as well. In the PAE/EM64T mode, the tie descriptors would be 8 bytes wide. If a single VMM (for example, EM64T-based VMM) is used for supervising a 32 bit guest OS, one option is to use only the least significant 4 bytes of and 8 byte tie descriptor, ignoring the most significant 4 bytes. Another option is to use the full 8 byte addressing for the tie descriptors/pointers.

According to another exemplary embodiment, the mapped paging tables (PDPT, PD and PT) are protected using read/write bit (RW-bit). A paging cache is validated according to Translation Lookaside Buffer (TLB) resets. Non-active paging tree tables can also be protected. The exemplary embodiment provides tracking of access (A) bits and of dirty (D) bits. It also provides for synchronization of A and D bits in guest physical pages.

Figure 8:
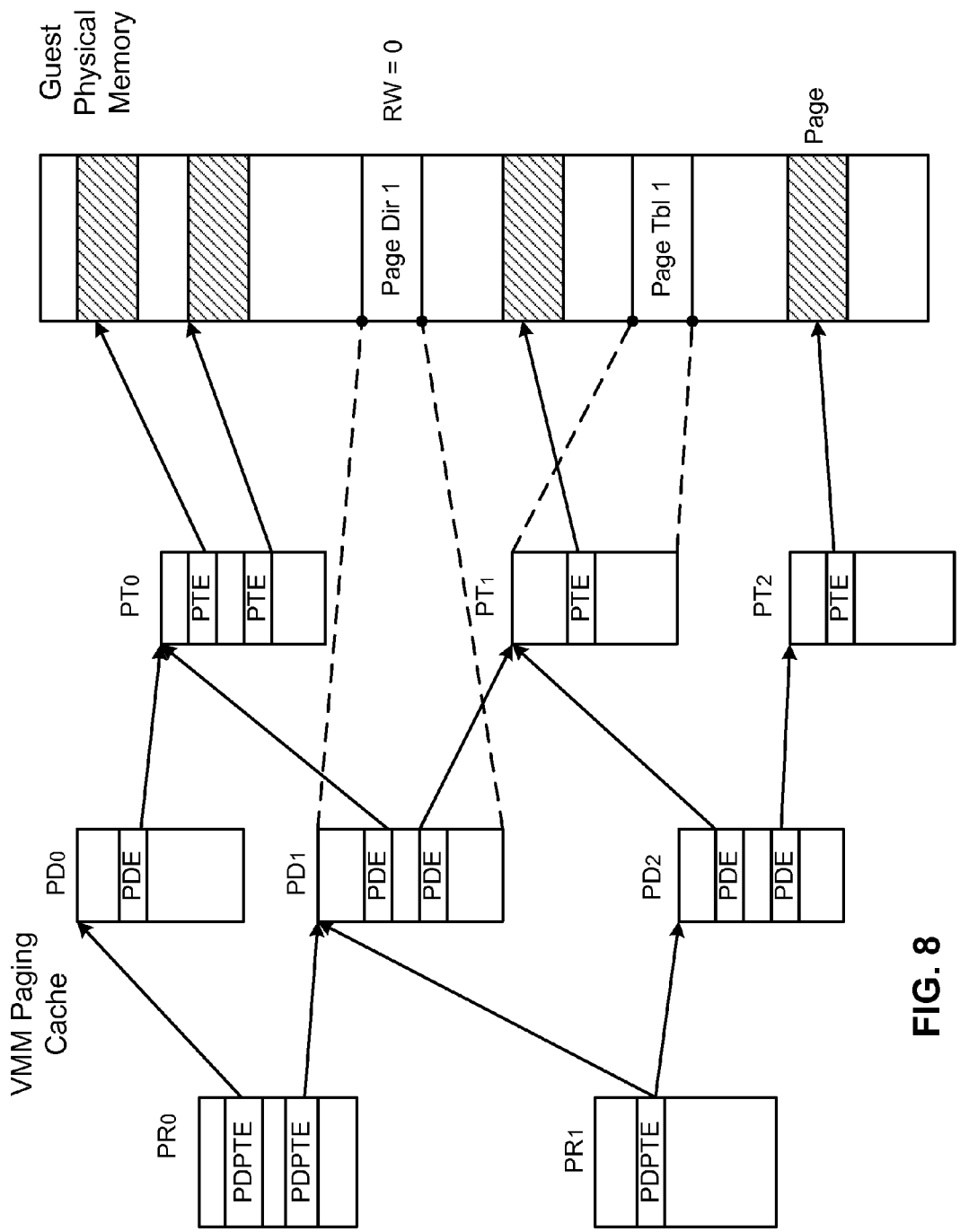
FIG. 8 illustrates optimization of paging cache protection in accordance with the exemplary embodiment.

FIG. 8 illustrates optimization of paging cache protection in accordance with the exemplary embodiment. FIG. 8 illustrates a VMM paging cache coupled to a guest physical memory. The page faults discussed above are generated when page protection is attempted to be violated. The exemplary embodiment is directed to optimization of page protection and reducing a number of page faults that cause costly overhead.

An exemplary paging cache depicted in FIG. 8 is a set of real paging tables. This paging cache uses a three-level model. The first level is paging root tree directory tables ($PR_0$ and $PR_1$). $PR_0$ is an active paging root that has a current control register CR3. $PR_1$ is a non-active paging root that does not have a real CR3 pointed to it. The elements (i.e., entries) of the paging root tables Page Directory Page Table Entries (PDPTE) point the entries in the page directory table at the second level—PDEs. The PDEs point to the entries in the page tables—PTEs, which, in turn, point to pages in a guest physical memory.

The VMM paging cache maps a guest linear address of a page to a guest physical page. All levels of tables depicted in FIG. 8 are involved in mapping of the linear address to a guest physical page. Each level maps its own native part (e.g., a bit region having) of the linear address. The last bit region of the address indicates the off-set of a particular memory cell within a physical page.

In order for the tables of the paging cache to correspond to the paging tables in the physical memory after the mapping, the paging cache tables need to be protected. Since the guest tables are cached, they need to be protected at least from writes. The physical and guest pages have bits A (access) and D (dirty). If the page table is accessed, the appropriate page table entries (PTEs) are marked with bit A. If the real PTE is modified, it is marked with bit D. The GOS checks for A and D bits periodically.

According to the exemplary embodiment, the A and D bits are set in the cached tables. The A and D bits need to be tracked in cached tables and periodically updated (i.e., synchronized) in the corresponding real tables. In order to provide an effective protection of the cached tables, a validation procedure is implemented. In the example depicted in FIG. 8 the Page Dir 1 is mapped to a physical page in the guest physical memory. All of the mapped elements need to be synchronized.

If the guest system changes the page, the changes may not affect the mapped elements. However, since the page is protected, the page faults will be generated. Thus, some additional page faults not related to the mapped entries (or related to the mapped entries that are not currently used) need to be processed, which creates an overhead. The exemplary embodiment optimizes this process by protecting all mapped paging tables (PDPT, PD and PT) by using RW-bit.

The real paging cache writes pages into a TLB cache. Then, the pages are accessed in the TLB cache using a linear address. The validity of TLB cache is checked using special instructions. The guest system performs validation instructions prior to using the linear address. The TLB cache can be cleared (or invalidated) by dropping the control register CR3 by writing to it. Thus, the TLB cache is validated based on its resets implemented by writes into the CR3.

According to the exemplary embodiment, all writes to the CR3 register are tracked. Once the change of the guest CR3 is detected, the paging roots elements corresponding to the new value of CR3 are found in the paging cache. Then all active records are scanned and the records that have changed are cleared. Alternatively, the INVLPG instructions of the guest system are used.

The INVLPG instruction receives a linear address and invalidates a corresponding element of the real TLB by deleting the record corresponding to the linear address. The INVLPG instructions are used after mapping is completed. The elements (e.g., PDPTE, PDE, PTE, etc.) of the active paging cache mapped to the linear address (where the current CR3 points to) are scanned and the system checks if a particular element had been changed in a guest physical memory. If the element had been changed in the guest physical memory, it is reset in the cache. Note that the write protection bit RW is not set in this situation.

In another embodiment, the paging cache can be invalidated by modifying CR4.GE bit. Global pages are mapped by OS kernel and are marked by a global bit GE. Thus, the global pages are present in all spaces regardless of the value in the CR3 register. Therefore the global pages are not cleared after the writes into the CR3 and are not removed from the TLB. In order to clear linear addresses of global cached pages from the TLB cache, the OS uses modification of the CR4.GE bit. When the CR4.GE bit is modified, the entire TLB cache is cleared including, both global and local pages.

The TLB cache can be cleared prior to modification of guest physical memory or after the memory modification. If TLB cache is cleared prior to modification of the guest physical memory, then, if write protection is not implemented, the cached TLB entry remains the same for a particular mapping of the linear address that is not modified, while the corresponding entry from the physical memory is deleted from the TLB cache. Then the guest OS modifies the mapped elements and the mapping becomes unsynchronized. Normally, this is not the case, as the guest OS modifies elements first and then clears the TLB.

However, for these exceptional cases, the exemplary embodiment uses a compromise protection scheme. In the compromise protection scheme, the paging root tables are protected by setting the RW bit and page directory entries, and page table entries are not protected since the INVLPG instructions take care of these entries, as discussed above. When the guest system wrote into PD and PT (see FIG. 8), it invokes INVLPG instructions. Alternatively, a write to the CR3 or modification of the CR4.GE bit can be used for synchronization of these entries.

According to the exemplary embodiment, for optimization purposes the non-active paging trees (for example, $PR_1$ in FIG. 8) are not protected and RW-bit is cleared. Thus, the guest system can write into the entries of the non-active paging tree root. However, when the CR3 is changed and non-active paging tree is about to become active, all mapped elements need to be checked for modifications. In other words, the validation is performed prior to turning the paging tree into an active paging tree.

According to an alternative exemplary embodiment, each paging structures (i.e., PTE, PDE) has an access bit A. When this bit is set at 1, the particular linear address is used for accessing the page mapped to this address. Page access means read or write into a page. Each paging structure also has a bit D (dirty bit) indicating that a page has been modified through this entry. The bit D is set in the entries of the lower level (in case of a 4 KB page it is PTE, if the page is 2 MB in size, it is PDE). The bit A is set in the entries of all or several levels of the paging structure hierarchy.

The control bits A and D are used by resource managers for allocating shared memory resources. The control bits are analyzed in guest tables using special algorithms based on a guest OS used. The guest OS is started using paging cache (i.e., shadow paging) and real paging tables are tables of monitor and the real entries (PTE, PDE) are different from the guest entries.

This problem is overcome by double-mapping and synchronization of read-write pages to paging cache. The bits A and D in the guest paging entries (PTE, PDE, etc.) are virtualized. When the guest OS accesses a page, a page fault is raised, and the VMM maps the linear address and the guest page. If the page is initially accessed on read, the page is mapped as read-only (regardless of its access status) and the A bit is updated (set to "1") in the guest PTE. When the guest OS attempts to modify the page, a page fault will occur since the page is mapped as read-only.

The mapping procedure is executed again and the page is re-mapped to read-write access by synchronizing the D bit indicating that the page was modified through this entry. Therefore, an effective virtualization scheme of the control bits A and D is achieved by double page mapping and double synchronization of the control bits. If the initial access to the page was a write, the page is mapped on read-write access and both bits A and D are synchronized in the guest paging entries.

Those skilled in the art will appreciate that the exemplary embodiment provided for effective optimization of paging cache protection that reduces the system overhead caused by processing a large number of page faults.

Figure 9:
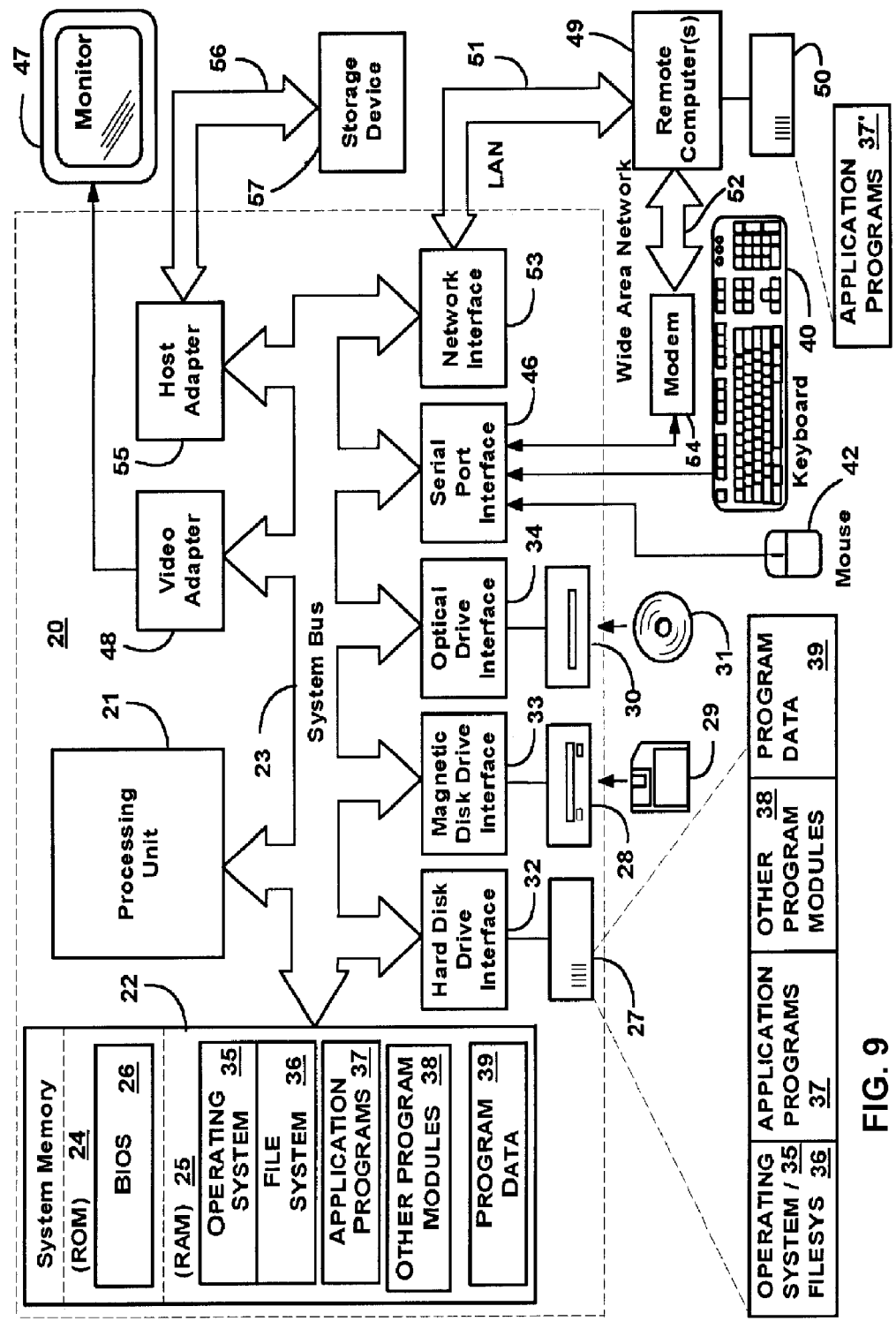
FIG. 9 illustrates an exemplary computer system where the embodiments described herein can be implemented.

With reference to FIG. 9, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for virtualizing a processor and protecting paging cache, comprising:

a virtualization system running on a computer system and controlling memory paging through hardware support for maintaining real paging structures;

a Virtual Machine (VM) running guest code and having at least one set of guest paging structures that are mapped to guest physical pages in guest address space using linear addresses; and a Virtual Machine Monitor (VMM) paging cache comprising mapped paging tables corresponding to pages of a guest physical memory, wherein the VMM paging cache is validated by recognizing Translation Lookaside Buffer (TLB) invalidation events initiated by the guest OS.

2. The system of claim 1, wherein at least a part of the guest paging tables is protected by a write protection bit.

3. The system of claim 2, wherein the guest paging structures and the real paging structures are organized into a hierarchy of layers.

4. The system of claim 3, further comprising an additional layer that utilizes a CR3 value for caching of paging translations for different values of CR3.

5. The system of claim 2, wherein the protection bit is an RW (read/write)-bit.

6. The system of claim 1, wherein at least some TLB invalidation events comprise any of:
the TLB is invalidated by performing an INVLPG instruction for page linear address; and
the TLB is reset by writing into a control register CR3; and
the TLB is reset by modifying a PGE bit (Page Global Enable) in a control register CR4.

7. The system of claim 6, wherein the paging tables comprise active paging tables having a current CR3 register pointing to them and non-active paging tables that do not have a current CR3 register pointing to them.

8. The system of claim 7, wherein the non-active paging tables are validated and protected only upon their activation by loading a value into the CR3 register.

9. The system of claim 1, further comprising means for tracking Access (A) and Dirty (D) bits.

10. The system of claim 9, wherein the A and D bits are synchronized in guest paging tables entries.

11. A method for optimization of paging cache protection, the method being performed on a computer having a processor and a memory, the method comprising:
initiating a virtualization system running on a computer system and controlling memory paging through hardware support for maintaining real paging structures;
launching a Virtual Machine (VM) running guest code and having at least one set of guest paging structures that correspond to guest physical pages in guest virtualized linear address space,
wherein at least some of the guest paging structures are mapped to the real paging structures; and
generating a Virtual Machine Monitor (VMM) paging cache comprising mapped paging tables corresponding to pages of a guest physical memory,
protecting the paging tables by using a write protection bit;
validating the VMM paging cache by tracking TLB resets and performing INVLPG instructions;
clearing the VMM paging cache by writing into a current control register CR3; and
tracking Access (A) and Dirty (D) bits and synchronizing the A and D bits in a guest physical memory,
wherein the VMM paging cache is validated by recognizing Translation Lookaside Buffer (TLB) invalidation events initiated by the guest OS.

12. The method of claim 11, wherein at least some TLB invalidation events comprise any of:
the TLB is invalidated by performing an INVLPG instruction for page linear address; and
the TLB is reset by writing into a control register CR3; and
the TLB is reset by modifying a PGE bit (Page Global Enable) in a control register CR4.

13. The method of claim 11, wherein the write protection bit is an RW (read/write)-bit.

14. The method of claim 11, further comprising, protecting global pages by modifying a CR4.GE bit.

15. The method of claim 11, wherein, if mapping entries become unsynchronized, protecting the paging root tables by setting the RW-bit and applying the INVLPG instructions to page directory and page table entries.

16. A method for optimization of paging cache protection, the method being performed on a computer having a processor and a memory, the method comprising:
initiating a virtualization system running on a computer system and controlling memory paging through hardware support for maintaining real paging structures;
launching a Virtual Machine (VM) running guest code and having at least one set of guest paging structures that correspond to guest physical pages in guest virtualized linear address space,
wherein at least some of the guest paging structures are mapped to the real paging structures using double-mapping;
generating a Virtual Machine Monitor (VMM) paging cache comprising mapped paging tables corresponding to pages of a guest physical memory;
protecting the paging tables by setting an Access bit (A) for each page as read-only;
executing re-mapping of the pages upon page access by resetting a Dirty bit (D);
resetting the Access (A) bit to read-write; and
synchronizing the A and D bits in a guest physical memory.

17. The method of claim 16, wherein the Access (A) bit is set as read-only regardless of a page access status.

* * * * *